(No Model.)
A. RICKETTS.
DISH CLEANER.
No. 603,153. Patented Apr. 26, 1898.
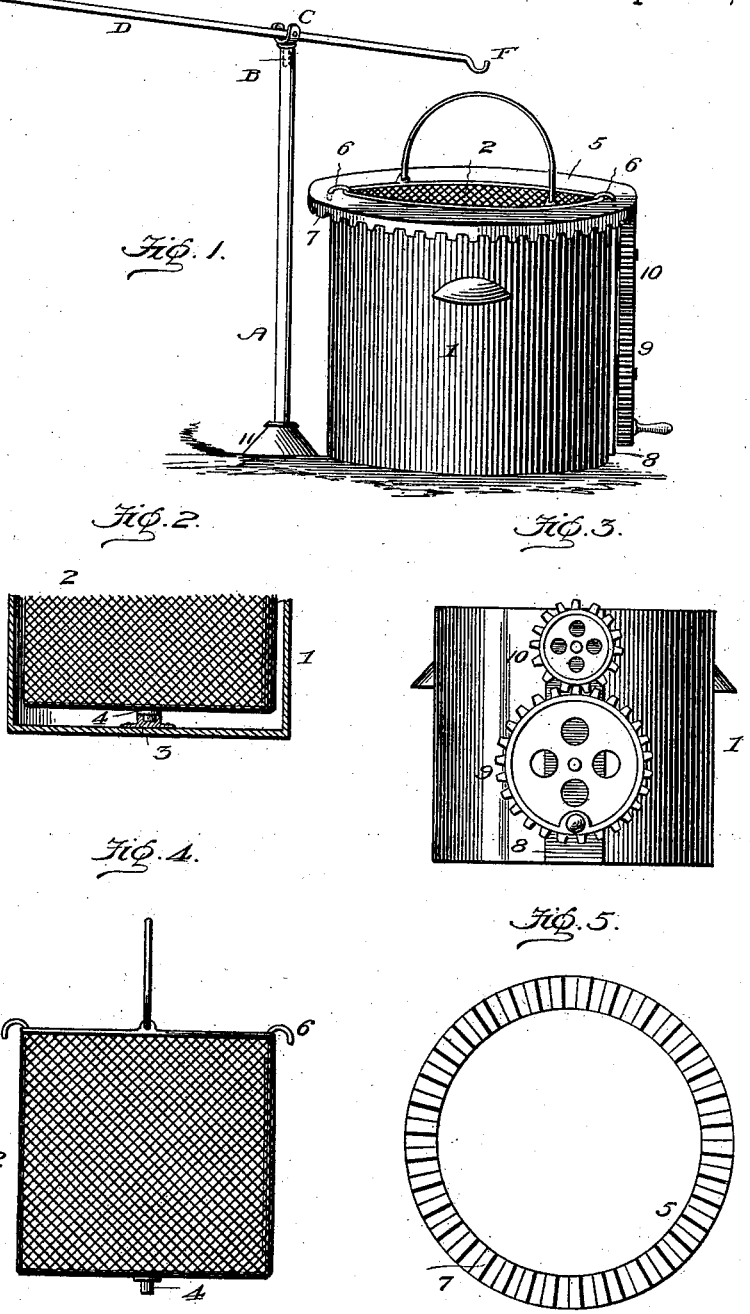

UNITED STATES PATENT OFFICE.

ADELLIE RICKETTS, OF MONTE VISTA, COLORADO.

DISH-CLEANER.

SPECIFICATION forming part of Letters Patent No. 603,153, dated April 26, 1898.

Application filed November 8, 1897. Serial No. 657,831. (No model.)

*To all whom it may concern:*

Be it known that I, ADELLIE RICKETTS, a citizen of the United States, residing at Monte Vista, in the county of Rio Grande and State of Colorado, have invented certain new and useful Improvements in Dish-Washers; and I do declare the following to be a full, clear, and exact description of the invention, such as will enable others skilled in the art to which it appertains to make and use the same.

My invention has relation to dish-washers; and the object is to provide a device of this character which shall be simple of construction, durable in use, comparatively inexpensive of production, and by means of which dishes may be quickly and thoroughly cleansed.

With this object in view the invention consists of certain features of construction and combination of parts, which will be hereinafter fully described and claimed.

In the accompanying drawings, Figure 1 is a perspective view of my improved dishwasher. Fig. 2 is a fragmentary sectional view showing the means for supporting the dish-cage in the water-receptacle to permit of the rotation of the former in the latter. Fig. 3 is a side view of the water-receptacle, illustrating the gearing. Fig. 4 is a view of the dish-cage removed, and Fig. 5 is a view of the gear-rim.

In said drawings, 1 denotes the water-receptacle, which may be of any well-known or approved form, and 2 denotes the dish-cage. The receptacle is provided in its bottom with a step 3, that receives a tenon 4, fixed to the bottom of the cage, so as to support the bottom of the cage free from the receptacle and permit of its easy rotation.

5 denotes a rim which is secured to the upper end of the cage by hooks 6. This rim is provided on its under surface with gear-teeth 7.

8 denotes a bracket secured to the side of the water-receptacle, and 9 denotes a drive-gear journaled on said bracket and in mesh with a similar gear 10, journaled to said bracket. This gear 10 is in mesh with the gear-rim of the dish-cage, so that by rotating the driving-gear 9 the cage will be rapidly rotated within the water-receptacle, and thus thoroughly cleanse the dishes.

After the dishes have been washed it is desirable to drain the same, and in order to support the cage over the receptacle without danger of burning the hands by coming in contact with the dishes or by the steam arising from the water I provide certain means. These means consist of a tubular post A, in the upper end of which is swiveled the stem B of a yoke C. A lever D is pivoted between the ends of the yoke, and is provided with a hook F, which is adapted to engage the bail of the dish-cage and lift it from the water-receptacle. The tubular post is preferably provided with a flat foot or base 11 to support the post in a vertical position.

From the foregoing description, taken in connection with the accompanying drawings, the construction and operation of the device will be readily understood without requiring further explanation. By its employment dishes may be thoroughly cleansed, and all liability of the operator burning the hands is entirely overcome.

Having thus described my invention, what I claim, and desire to secure by Letters Patent, is—

In a dish-washer, the combination with a water-receptacle, of a dish-cage supported in said water-receptacle to have a rotary motion therein, a rim secured to the upper end of said dish-cage and provided on its under side with gear-teeth, gear-wheels journaled to the side of the water-receptacle, one of said gear-wheels being in mesh with the teeth of the rim, substantially as set forth.

In testimony whereof I hereunto affix my signature in presence of two witnesses.

ADELLIE RICKETTS.

Witnesses:
BERTHA GIFFORD,
R. G. BRECKENRIDGE.